US006067707A

United States Patent [19]

Cluggish

[11] Patent Number: 6,067,707

[45] Date of Patent: May 30, 2000

[54] RING APPLYING AND CLINCHING DEVICE

[75] Inventor: Raymond F. Cluggish, Indianapolis, Ind.

[73] Assignee: Stanley Fastening Systems, L.P., East Greenwich, R.I.

[21] Appl. No.: 09/173,555

[22] Filed: Oct. 16, 1998

Related U.S. Application Data

[60] Provisional application No. 60/062,236, Oct. 16, 1997.

[51] Int. Cl.[7] .......... B23Q 7/10

[52] U.S. Cl. .......... 29/816; 29/243.56; 29/809; 29/811.2; 72/409.03

[58] Field of Search .......... 29/513, 816, 243.56, 29/525.05, 809, 811.2; 72/409.02, 409.03, 453.16

[56] References Cited

U.S. PATENT DOCUMENTS

| | | | |
|---|---|---|---|
| 2,396,562 | 3/1946 | Forss | 140/55 |
| 2,539,313 | 1/1951 | Miller . | |
| 2,756,427 | 7/1956 | Van Zante . | |
| 2,968,042 | 1/1961 | Yankee | 29/243.56 |
| 3,537,293 | 11/1970 | Gerlach | 72/407 |
| 3,628,230 | 12/1971 | Grise . | |
| 3,743,161 | 7/1973 | Spencer | 227/124 |
| 4,890,474 | 1/1990 | Agostini et al. | 29/243.56 |
| 5,123,273 | 6/1992 | Kawabata | 29/243.56 |
| 5,483,815 | 1/1996 | West . | |
| 5,653,140 | 8/1997 | West . | |
| 5,709,124 | 1/1998 | Murayama | 29/243.56 |
| 5,881,452 | 3/1999 | Nowel, III et al. | 29/243.56 |

*Primary Examiner*—David P. Bryant
*Assistant Examiner*—Jermie E. Cozart
*Attorney, Agent, or Firm*—Pillsbury Madison & Sutro LLP

[57] ABSTRACT

The present invention relates to a ring applying and clinching device for applying successive C-shaped rings to a workpiece. The device comprises a housing structure and a magazine assembly constructed and arranged to support a supply of releasably interconnected C-shaped rings. Each of the rings have opposing leg portions defining an opening therebetween for providing access to an interior of each ring. The magazine assembly comprises structure configured to move the ring supply in a feeding direction such that a lead ring is disposed in a feeding position ready. A pair of opposing jaw members have ring engaging inner surfaces facing generally towards one another. The inner surfaces engage the lead ring in the feeding position. A ring clinching and applying mechanism is constructed and arranged such that manual operation of the actuating mechanism causes the clinching and applying mechanism to (1) move the jaws in a clinching direction such that the inner surfaces thereof engage exterior surfaces of the lead ring in the feeding position thereof so as to grasp the ring without substantially closing the ring opening defined between the opposing leg portions thereof, (2) then move the jaws in an forward direction towards the workpiece without substantial further movement thereof in the clinching direction so as to separate the lead ring from the ring supply and move the lead ring into an applying position wherein the lead ring is disposed forwardly of the housing structure to enable a portion of the workpiece to be received within the lead ring interior through the lead ring opening, and (3) thereafter further move the jaws in the clinching direction such that the inner surfaces further move generally towards one another so as to close the lead ring opening and thereby apply the lead ring in surrounding relation to the workpiece portion received in the interior thereof.

23 Claims, 11 Drawing Sheets

RING APPLYING AND CLINCHING DEVICE

This application claims the benefit of U.S. Provisional Application Ser. No. 60/062,236, filed Oct. 16, 1997.

FIELD OF THE INVENTION

The present invention relates to ring clinching and applying devices.

BACKGROUND OF THE INVENTION

U.S. Pat. No. 3,628,230 illustrates an example of a conventional ring clinching and applying device. The device has a pair of jaws constructed to engage a lead ring move the ring forwardly along a frame. The frame extends forwardly and has a notch at the forwardmost end thereof. The jaws moves the ring forwardly until it reaches the notch and then pivot towards one another to close the ring around a workpiece. Such devices are commonly used for fastening together chicken wire structures, attaching chain link fences, assembling lobster traps, and sealing ice bags, among other uses. One problem associated with the type of device disclosed in the '230 patent is that the forwardly extending frame can interfere with application of the ring in particularly tight places. Specifically, because the jaws in the device of the '230 patent can only extend as far as the frame, the device can only be used to apply rings in areas in which the frame itself can fit. In the device of the '230 patent, the frame is necessary and cannot be removed because it serves to guide the ring during its forward movement. The jaws do not grasp and clinch the ring until it has reached a forward, applying position; instead the jaws simply push the ring along the laterally facing surface of the frame.

SUMMARY OF THE INVENTION

It is therefore an object of the present invention to provide a ring clinching and applying device which is capable of applying rings without interference from fixed structures associated with the housing. In order to achieve such an object, there is provided a ring applying and clinching device for applying successive C-shaped rings to a workpiece. The device comprises a housing structure and a magazine assembly constructed and arranged to support a supply of releasably interconnected C-shaped rings. Each of the rings have opposing leg portions defining an opening therebetween for providing access to an interior of each ring. The magazine assembly comprises structure configured to move the ring supply in a feeding direction such that a lead ring is disposed in a feeding position. A pair of opposing jaw members have ring engaging inner surfaces facing generally towards one another. The inner surfaces are configured to engage the lead ring in the feeding position. A ring clinching and applying mechanism is operatively associated with the jaws. A manually operable actuating mechanism is operatively connected to the clinching and applying mechanism. The actuating mechanism includes structure constructed and arranged such that manual operation of the actuating mechanism causes the clinching and applying mechanism to (1) move the jaws in a clinching direction such that the inner surfaces thereof move generally towards one another and engage exterior surfaces of the lead ring in the feeding position thereof so as to grasp the ring without substantially closing the ring opening defined between the opposing leg portions thereof, (2) then move the jaws in an forward direction towards the workpiece without substantial further movement thereof in the clinching direction so as to separate the lead ring from the ring supply and move the lead ring into an applying position wherein the lead ring is disposed forwardly of the housing structure to enable a portion of the workpiece to be received within the lead ring interior through the lead ring opening, and (3) thereafter further move the jaws in the clinching direction such that the inner surfaces further move generally towards one another so as to close the lead ring opening and thereby apply the lead ring in surrounding relation to the workpiece portion received in the interior thereof.

Other objects, advantages, and features will become apparent from the following detailed description, the accompanying drawings, and the appended claims.

DETAILED DESCRIPTION

Figure 1:
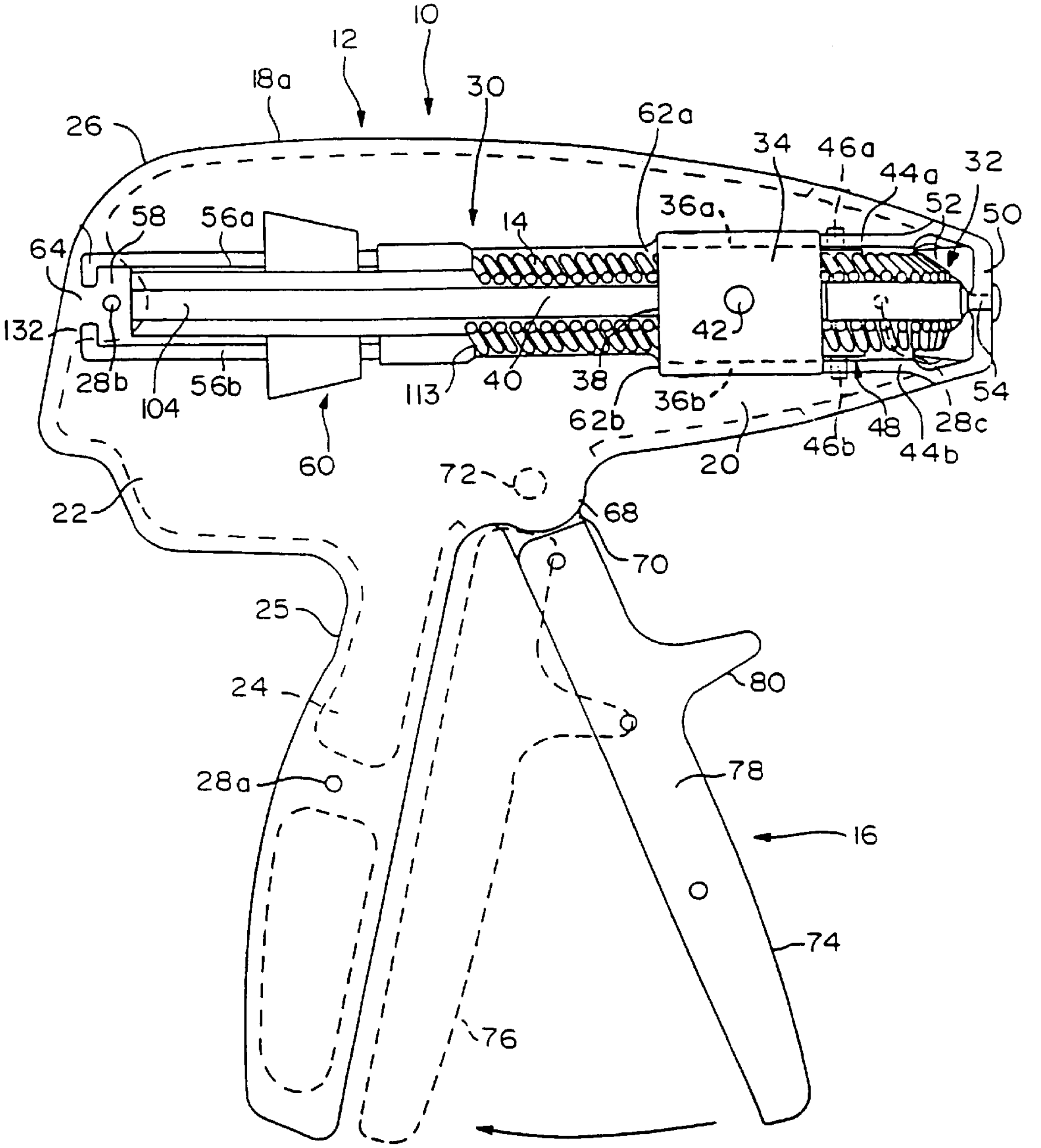
FIG. 1 is a right side elevation of a ring applying and clinching device with an attached ring magazine assembly in accordance with the present invention.

Referring now to FIGS. 1–3, 4A, 5–10, 12 and 13 of the drawings, there is shown therein a manually actuated ring applying and clinching device, generally indicated at 10, which embodies the principles of the present invention. The device 10 includes a housing assembly, generally indicated at 12, constructed and arranged with a magazine assembly, generally indicated at 30, to receive and apply successive fasteners in the form of C-shaped rings releasable interconnected in an elongated assembly indicated generally at 14. The C-shaped rings each have opposing leg portions defining an opening therebetween for providing access to an interior of each ring.

The magazine assembly 30 feeds successive leading fasteners 14 into a feeding position on the housing assembly 12 where, in response to the manual actuation of an actuating mechanism, generally indicated at 16, the fastener 14 is first gripped by the device 10, then moved outwardly into an applying position and finally clinched in surrounding relation with respect to a workpiece by a ring applying and clinching mechanism. C-shaped rings are have a wide variety of uses including constructing and repairing marine lobster and crab traps, assembly of automotive seat upholstery, constructing and maintaining rabbit and other small animal cages and ice bag and other types of bagging construction and repair. The C-shaped rings are well suited for joining together fabric or wire structures, such as chicken wire, leather and various types of netting.

In the embodiment shown in FIG. 1, the housing assembly 12 is comprised of a pair of housing members preferably molded of a plastic material, typically DUPONT DELRIN. It can be appreciated that by molding the housing out of a plastic material, the device is made strong, light and portable, thereby allowing for ease of manual operation. The housing assembly is appropriately shaped to define a molded head portion 20, a body portion 22 and a fixed handle portion 24.

The housing assembly 12 includes a right housing member 18*a* and a left housing member 18*b*. The right housing member 18*a* is a molded one-piece structure with rounded edges. The molded body of right housing member 18*a* extends inwardly about the periphery thereof, thus forming a continuous side wall 26 that mates directly to the left housing member 18*b* and attaches thereto at threaded bores 28*a*, 28*b* and 28*c* by means of a plurality of fasteners 94. When the housing members 18*a* and 18*b* are thus joined, they create an interior cavity to carry a plurality of operating mechanisms therein.

As can be seen in FIG. 1, the head portion 20 of right housing member 18*a* is molded to receive the magazine assembly 30 which is mounted longitudinally along housing body portion 22 which magazine assembly 30 in turn receives and directs the C-shaped rings 14 into a feeding position indicated at 32. The housing member 18*a* defines a rectangular aperture in the head portion 20 thereof and a pair of essentially parallel side elements 36*a* and 36*b* integrally formed with the housing member 18*a* extend outwardly therefrom above and below the rectangular opening and hold an integrally formed essentially planar rectangular member 34 essentially parallel to the outer surface of the body portion 22 of the housing member 18*a*. The side elements 36*a* and 36*b* and the rectangular member 34 cooperate to form a passageway 38 through which a fixed ring guide 40 is directed. A through going bore 42 in the center of the rectangular member 34 receives a screw 43 or other fastening element to secure the fixed ring guide 40 to the underside of the rectangular member 34. The front edges of two parallel side elements 36*a* and 36*b* extend forwardly to form essentially parallel arcuate extensions 44*a* and 44*b*. Small, axially aligned through going bores 46*a* and 46*b* are formed in the arcuate extensions 44*a* and 44*b* to provide attachment points for one end of a retracting flat spring member, generally shown at 114.

The head portion 20 extends forwardly from the body 22 and gradually tapers to define a blunt face 50 at the forwardmost end thereof. A forward section of the head portion defines an opening 52 larger than a C-shaped ring 14. A hole 54 extends through the blunt face 50 for securing the forward end of the ring guide 40 with a screw or other securing device. The ring guide 40 guides the C-shaped rings 14 into the ring feeding position 32 without interference and in proper operational alignment. It can also be appreciated that rings of various sizes, other than those shown in the embodiment may be utilized by the device. For example, three eighths inch C-shaped rings 14, three quarter inch C-shaped rings and one half inch C-shaped rings can be fed and applied by the device.

Raised parallel walls 56*a* and 56*b* integrally formed with the housing body portion 22 extend longitudinally along a central portion thereof from the rear of the body portion 22 to the rear of the head portion 20, thus forming a guide channel 58 for a spring loaded pusher element generally shown at 60. Each wall 56*a* and 56*b* extends slightly outwardly at the forward end thereof and is molded into the corresponding back edges 62*a* and 62*b* of the side elements 36*a* and 36*b*. The back edges 62*a* and 62*b* form a stop for the pusher 60 preventing any farther forward movement. At the rear of the guide channel 58, the two walls 56*a* and 56*b* form inwardly toward each other, creating a slot 64 between the wall ends.

An elongated fixed handle portion 24, as shown in FIG. 1, extends from the body portion 22 and angles slightly rearwardly. The back edge 25 of the handle is appropriately shaped to comfortably fit the contour of the palm of a hand and provide a leverage point for manual actuation. A section of the housing side wall 26 located slightly forward of the fixed handle is slotted, as indicated at 68, to receive an interiorly protruding, movable handle assembly 70 that is pivotally attached internally at pin member 72 to allow rotational movement through its most forward or cocked position 74 to its fully retracted, clinched position 76 shown in phantom in FIG. 1. The front side of a molded plastic movable handle cover 78 forms a protrusion 80 that extends forwardly from the handle for the placement of an index finger above the protrusion with the rest of the fingers placed below the protrusion, thus allowing force to be applied to the movable handle 70 with the fingers in an efficient and comfortable manner.

Figure 2:
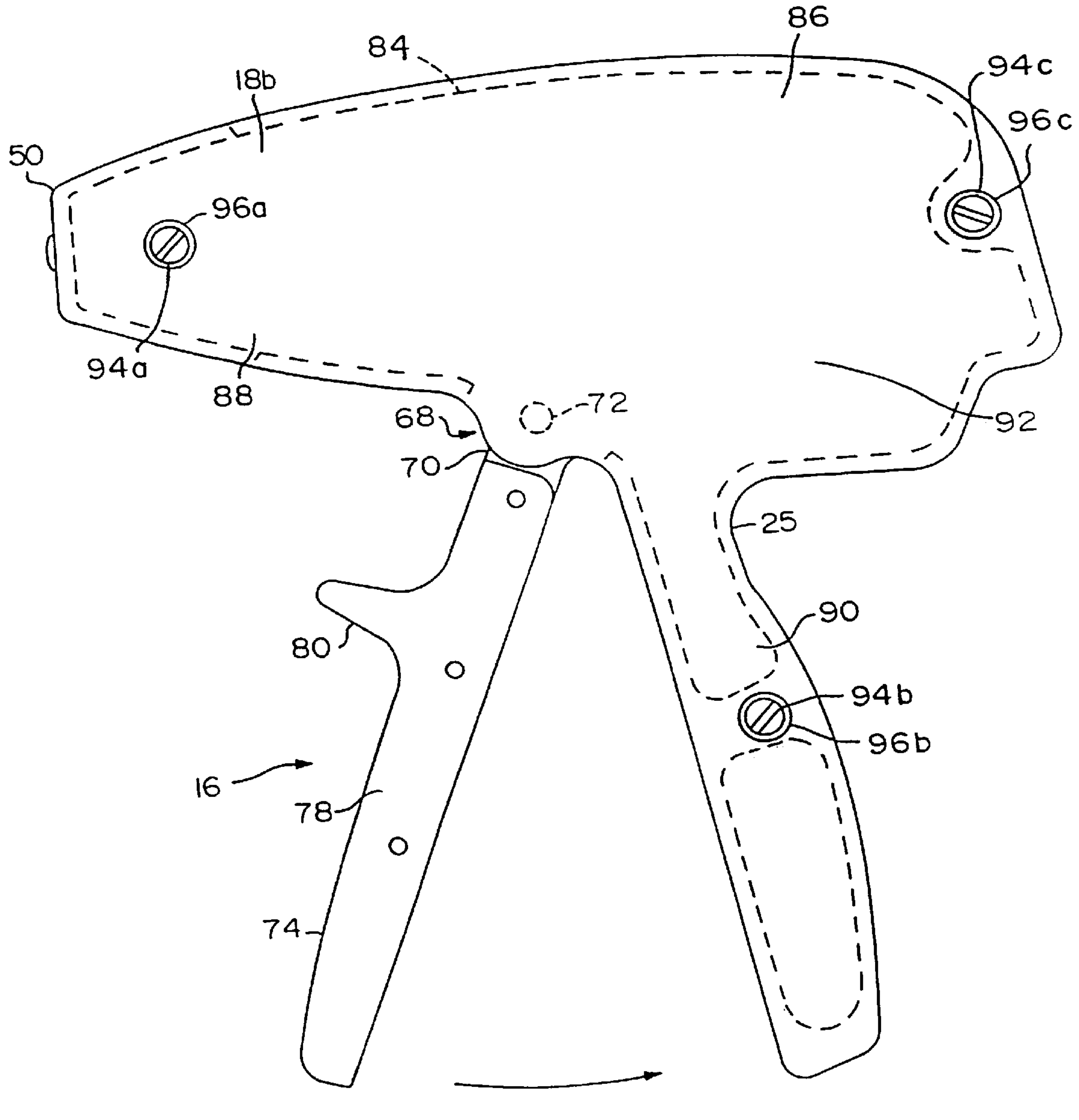
FIG. 2 is a left side elevation of the ring applying and clinching device.

As shown in FIG. 2, the left housing member 18*b* is a molded one-piece structure with an interconnecting side wall 84 that is secured to side wall 26 of the right housing member 18*a*. The body 86, head 88 and fixed handle portions 90 of the left housing member 18*b* form a single, integral molded face structure 92. Through going apertures in the left housing member 18*b*, including centrally located aperture 94*a* and fixed handle aperture 94*b* and rearwardly located body aperturc 94*c* are aligned with the threaded bores 28*a*, 28*b* and 28*c* in the right housing member for attaching the two housing members together with screws or other securing devices in a manner well known in the art. The apertures 94*a*, 94*b* and 94*c* are counter bored at 96*a*, 96*b* and 96*c* to a slightly larger diameter than the apertures to allow the heads of the screws or other securing devices to lie below the exterior surface of the housing member 18*b*.

Figure 3:
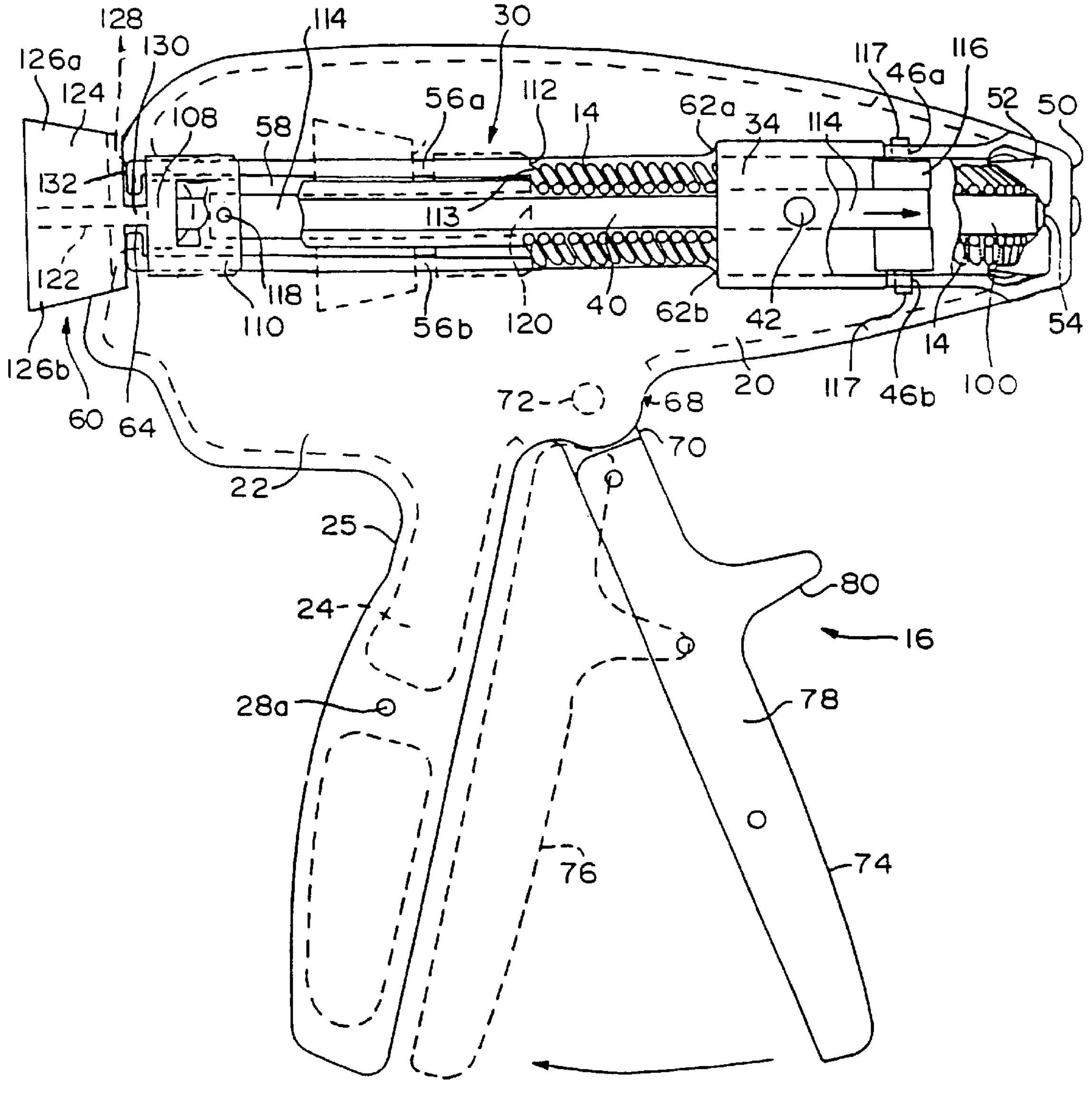
FIG. 3 is a right side elevation of the ring applying and clinching device with portions of a housing member removed to show structural details of the ring magazine assembly and showing a second position of a pusher in phantom.
Figure 4A:
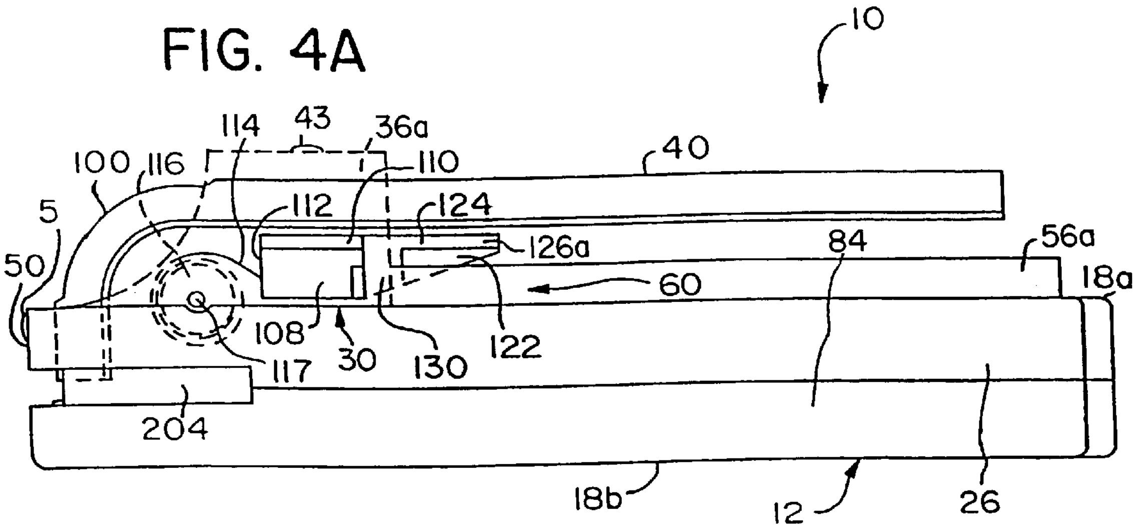
FIG. 4A is a top plan view of the ring applying and clinching device with a portion of a housing member shown in phantom to reveal the structure of a magazine assembly.
Figure 6:
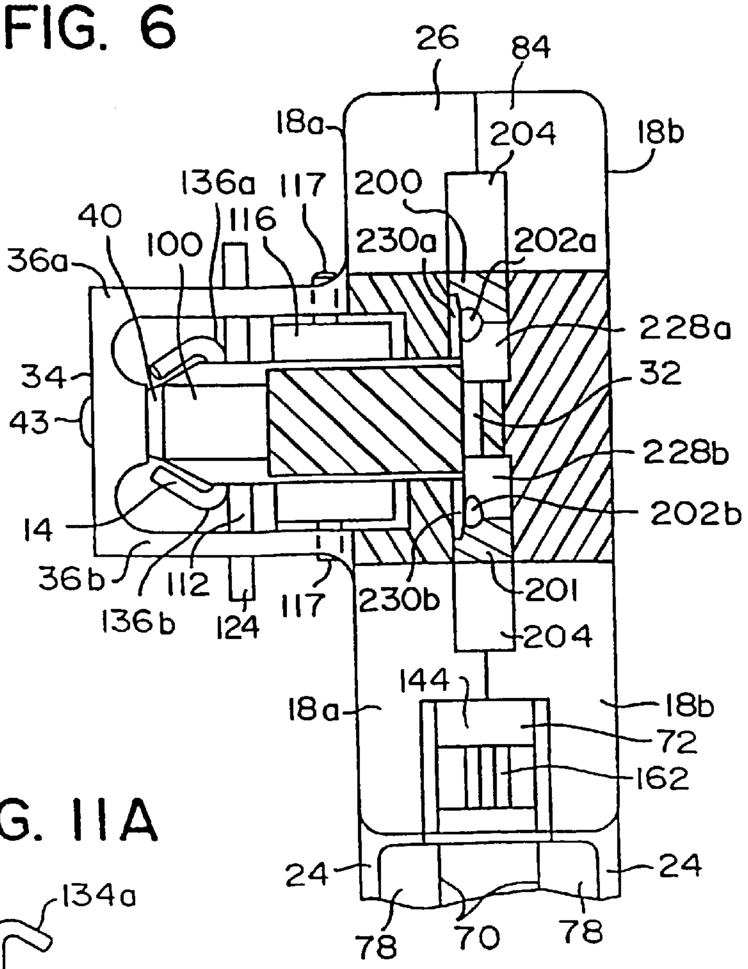
FIG. 6 is an enlarged cross-sectional view taken across lines 6—6 of FIG. 5 showing the jaw faces and ring feeding area into which the C-shaped rings are directed.

As can be seen on FIGS. 3 and 4A, the magazine assembly, generally indicated at 30 on FIG. 3, includes the fixed guide 40, flat spring 114 and the spring loaded pusher 60 used to urge a package of C-shaped rings 14 forwardly along the fixed guide 40 to slide the forwardmost ring into the feeding position 32. The elongated fixed guide 40 is molded of a plastic material, typically DUPONT DELRIN, and has a trapezoidal cross section best seen in FIG. 12 wherein the interior edge thereof is slightly shorter than the interior length of the crown 132 of the rings 14, which is best seen in FIG. 6 to allow the rings to slidably engage the guide 40. The portion of the face of the fixed guide 40 which extends from the hole 54 in the blunt face 50 rearwardly to the front end of the passageway 38 is cut back to create thinner portion 100, best seen in the top view of FIG. 4*a*, to create a smooth bending radius to facilitate the passage of a plurality of rings around a curved portion of the guide 40 into the feeding position 32. Continuing rearwardly, the fixed guide 40 passes through the passageway 38 where it is attached at bore 42. The fixed guide 40 extends linearly rearwardly from the passageway 38 to its rearmost portion 104 thereby maintaining a parallel alignment with a pusher guide channel 58.

The spring loaded pusher 60 is a one-piece plastic molded member that defines a shoe portion 108 that is slidably received within the guide channel 58. A top portion 110 of the shoe portion 108 extends outwardly forming a plurality of sides that extend outwardly over the top edge of the guide channel 58. The front edge 112 of the top portion 110 of the shoe 108 contacts the crown 132 of an end ring of a plurality of rings to urge them forward along the guide 40. The top portion 110 is dimensioned to slide into the passageway 38.

The retractable flat spring 114 engages a roller 116 at its forward end which roller is rotatably secured to the passageway extensions 44*a* and 44*b* by a roller pin 117. The flat spring 114 extends rearwardly along the guide channel 58 and is attached to the pusher shoe 108 underneath the top portion 110 thereof. The flat spring 114 biases the pusher member 60 forwardly, thereby urging the ring package in the same direction. It can be appreciated that since the flat spring 114 is attached under the shoe top portion 110 and retracts over the top of the roller 116, the pusher 60 is biased slightly upwardly causing the front edge of the top portion 110 of the shoe 108 to engage the back of the fixed guide 40 squarely, thus maintaining a continually positive forward biasing action against the plurality of rings 14.

An essentially planar triangular shaped element 122 best seen in FIG. 4A is integrally formed with the shoe 108 and extends upwardly therefrom between the guide channel walls 56*a* and 56*b* and extends rearwardly from the back end of the shoe 108 to define a tapered rearmost end. A wing-shaped structure 124 which is in essentially the same plane as the top portion 110 of the shoe 108 is integrally formed with the triangular shaped element 122 and is held above the guide channel walls 56*a* and 56*b* when the shoe portion 108 is slidably positioned therebetween. The wing-shaped structure 124 includes an upper angular wing 126*a* and a lower angular wing 126*b* both of which extend rearwardly to facilitate manual movement of the pusher 60 along the fixed guide 40. The front edge of the wing-shaped structure 124 extends slightly downward forming a flange 128. A central portion of the triangular shaped element 122 extends between the front of the flange 128 and the back of the shoe 108 forming a key 130 that fits into the slot 64 at the back end of the guide channel 58. When the key 130 is in the slot 64 and the flange 128 is in contact with the exterior wall 132 at the rear of the guide channel 58, the pusher 60 is held in a retracted position against the force of the flat spring 114. When the pusher 60 is released from the slot 64 and acts against a ring package as at 113, the bottom edge of the flange 128 rides against the top of the guide channel walls 56*a* and 56*b* and cooperates with the flat spring 114 to prevent the rings 14 from sliding rearwardly over the pusher member 60. The flat spring 114 biases the front portion of the pusher 60 upwardly and the pusher 60 pivots or rotates upwardly toward the fixed guide structure 40 about the flange 128 which pivotally engages each guide channel wall as the flange slides longitudinally thereacross. This pivoting action causes the pusher 60 to continuously bias upwardly against the inwardly facing surface of the guide 40 while the pusher is simultaneously being forward biased against the fasteners 14. When the pusher 60 is manually pulled back and the key 130 is fitted into the slot 64, the pusher is in the loading position and a new ring package 14 can slide onto the fixed guide 40. When the pusher 60 is released from the loading position, the front edge 112 thereof forwardly biases the back of the ring package 14 and the pusher 60 moves forward along the guide 40 as the rings 14 are used through actuation of the device. As the pusher 60 is pulled forward by the spring 114, the shoe top portion 110 of the pusher 60 advances into the passageway 38 until the flange 128 contacts the back end of the side elements 62*a* and 62*b* of the passageway 38 which stops any farther forward movement of the pusher 60 and prevents the pusher from contacting the spring roller 116. When the pusher 60 is in this position there is no longer any positive force being applied to the rings 14 so the pusher 60 must be manually moved rearwardly to allow the key 130 to enter the slot 64 to permit the loading of a new ring package onto the guide 40.

Figure 4B:
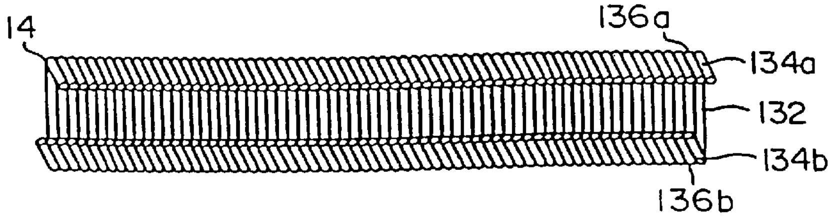
FIG. 4B is a bottom plan view of an assembly of rings.
Figure 4C:
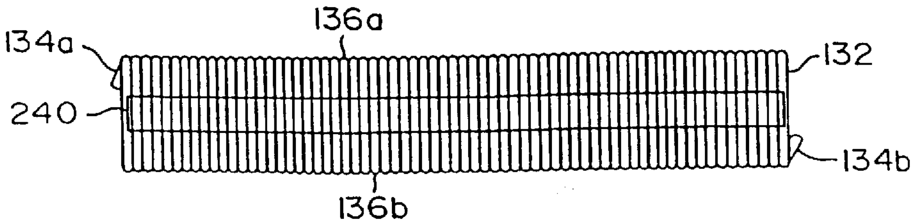
FIG. 4C is a top plan view of an assembly of rings.

A ring package is shown in FIGS. 4B and 4C and is comprised of a plurality of C-shaped rings 14 releasably interconnected by a polyester tape-like film 240 approximately three to four mils. thick. A heat-sensitive adhesive on one side of the tape secures the crowns 132 of the rings 14 at a temperature of around 350° F. Because the rings are held together by a polyester film, the ring package is flexible and this flexibility of the package allows the ring package to move through the curved portion of the fixed guide 40 as the package is urged toward the feeding position 32 by the pusher 60. The polyester tape-like film 240 is strong enough to hold the ring package 14 together yet it allows each individual ring to easily break free from the package 14 as actuating force is applied to the device 10. As can be seen in FIG. 4B, the upper portions of each of the legs 134*a* and 134*b* curve inwardly to form shoulders 136*a* and 136*b* and the legs 134*a* and 134*b* are offset so that the legs overlap and remain in contact along their lengths after they are brought together during the crimping process, as illustrated on FIGS. 1A through 1E. The rings typically have a diameter of three eighths of an inch, three quarters of an inch or one half inch, although larger and smaller diameter rings can be loaded and applied to a work piece successfully.

Figure 5:
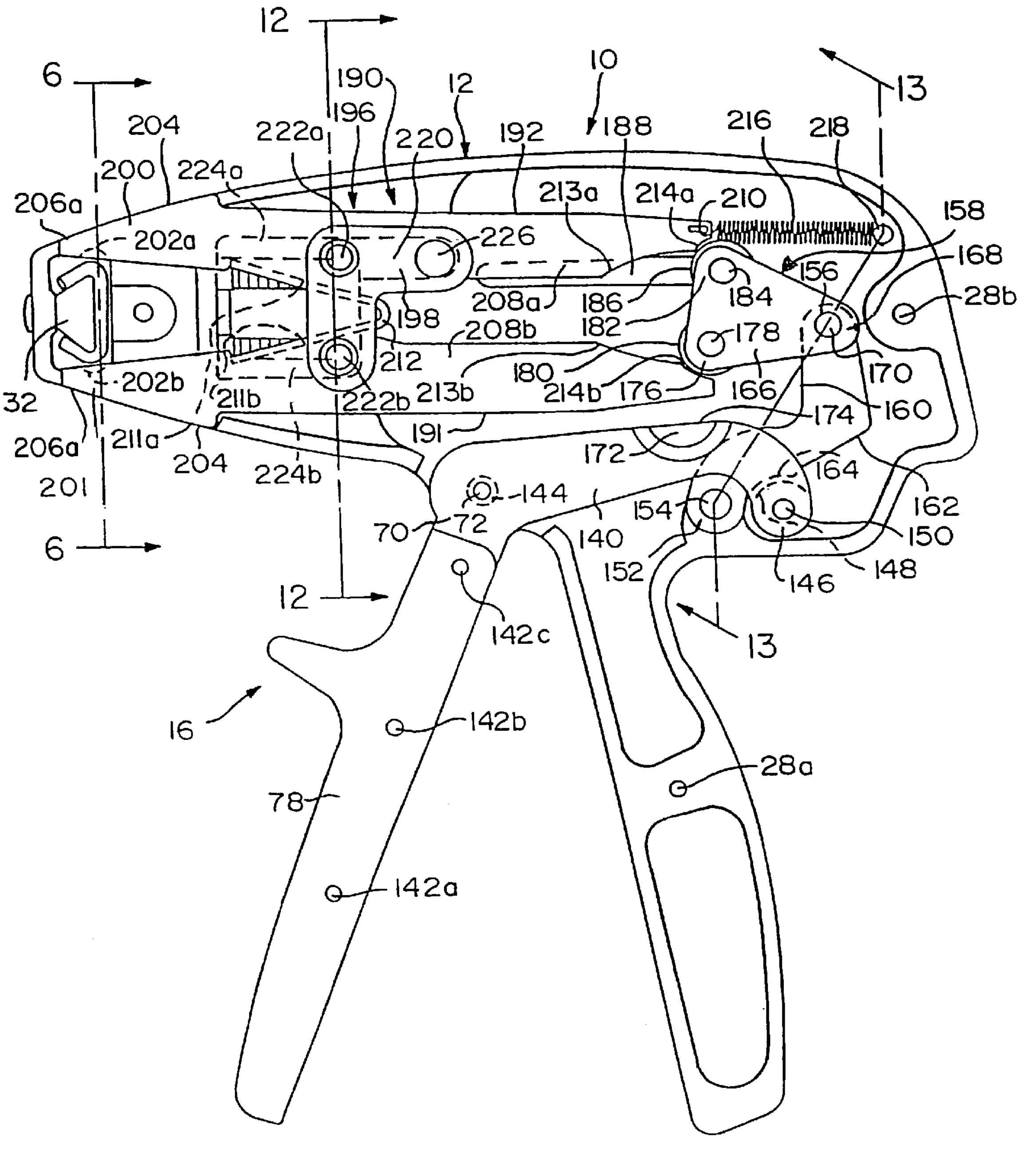
FIG. 5 is a left side elevation of the interior of the ring applying and clinching device with a left housing member removed to show a ring applying and clinching mechanism.

As can be seen in FIG. 5, the ring applying and clinching device 10 is actuated by a manual ring applying and clinching mechanism, generally indicated at 190. It can be appreciated, though, that the ring applying and clinching device 10 could be power actuated including being pneumatically, electrically or electromechanically actuated. The ring applying and clinching mechanism includes a movable handle 70 which, when depressed, biases an actuating cam member 152 which is pivotally linked to a biasing member 158. More specifically, the movable handle 70 is mounted for pivotal movement about a handle pivot pin 72 which is secured within aligned bores formed in the two housing members 18*a* and 18*b* of the housing assembly 12. The handle 70 includes an interiorly protruding portion which forms two stamped, spaced walls 140 that continue rearwardly from the fixed pin 72 and terminate in arcuate ends 146. Moving downwardly from the fixed pivot pin 72, the spaced walls 140 extend exteriorly, and angle slightly forwardly extending into a plurality of slots formed in a molded plastic manual handle member 78. The plastic handle member 78 is attached to the handle 70 by a plurality of roll pins **142*a*, 142*b* and 142*c*, but other attaching devices could be used such as screws. The plastic handle member 78 helps maintain the proper alignment and spacing of the handle walls 140. The pivot pin 72 has a central portion 144 that is of a larger diameter then the ends 146 thereof about which the handle walls 140 are fitted that helps maintain proper spacing between the walls 140. At the rear of the arcuate ends 146, a roller 148 is attached at 150 between the walls 140 which secures the ends of the spaced walls 140 together and provides a contact point for biasing the actuating cam member 152. An arcuate protrusion 172 is formed in the upper edge of each central portion of each of the two essentially parallel handle walls 140. Each of the two arcuate protrusions 172 extends outwardly from the handle wall 140 on which it is formed toward an adjacent housing member and the two arcuate protrusions 172 cooperate to receive the two rearwardly directed apexes of the biasing member 158 to move the biasing member 158 forward and to prevent binding interference during operation of the device when the movable handle 70** is clinched to activate the device.

Figure 13:
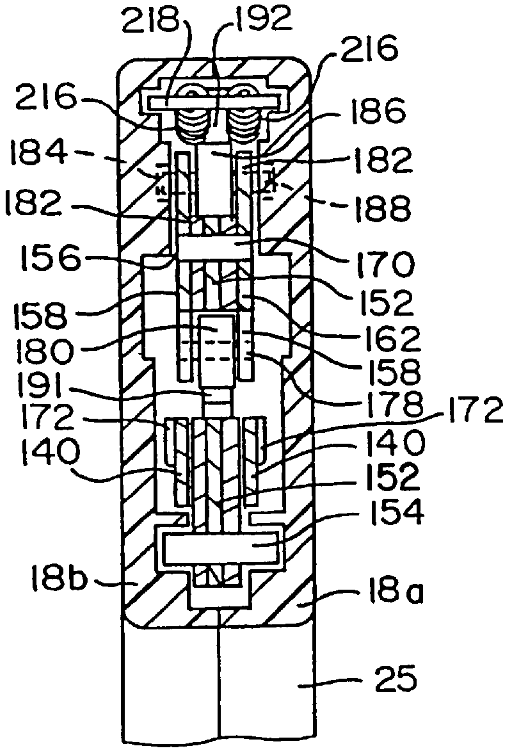
FIG. 13 is a cross-sectional view taken across line 13—13 of FIG. 5 showing the biasing member and movable handle interconnected through the pivotal actuating cam member.

The actuating cam member 152 is positioned between the handle walls 140 and is free to pivot therebetween. As can be seen in FIG. 13, the actuating cam member is rotatably secured at its lower end by a pivot pin 154 affixed in aligned bores formed on the interior of the housing assembly and the biasing member 158 is pivotally attached to the cam member 152 at the upper end thereof. Referring to FIG. 5, the actuating cam member 152 is generally L-shaped, thus preventing interference with other mechanisms during operation. The back edge 162 of a lower portion contacts the handle roller 148 and defines a curvilinear seat portion 164 which can receive the roller 148 at the lower pivotal end.

The biasing member 158 includes two triangular sides 166 which are held in spaced relation by a plurality of connecting pins 170, 178 and 184. More specifically, FIG. 5 illustrates that each of the triangular sides 166 form three apexes and that each apex is apertured. Each of the apexes defined by a triangular side 166 engages opposite ends of a connecting pin. The lower apex 176 of each side 166 of the biasing member 158 receives one end of an aligning pin 178 which pin in turn holds a roller element 180 rotatably between the sides 166. As best seen in FIG. 13, each of the apertures in the apexes 182 of the sides 166 of the biasing member 158 receives the ends of a guide pin 184, both ends of which laterally protrude from the sides 166 at the apex 182 and which rollingly support a roller element 186 between the sides 166. The housing elements **18*a* and 18*b* define internal slots 188 to slidably receive the laterally protruding ends of the guide pin 184 which cooperate with the slots 188 to guide the longitudinal movement of the biasing member 158. The third apex 168 of each side 166 defines an aperture 156 which receives opposite ends of pin 170. The pin 170 holds the two sides 166 in spaced relation and also serves as the pivotal point of attachment of the actuating cam member 152 to the biasing member 158. The upper end of the actuating cam member 152 is held between the sides 166 by the pin 170 and the biasing member 158** pivots freely thereabout.

The interconnected members of the actuating mechanism act together to effect operational movement of the ring applying and clinching mechanism 190. The biasing member roller 180 engages a lower jaw member 191 and the biasing member roller 186 engages an upper jaw member 192. The biasing member rollers 180 and 186 cooperate to effect forward movement and pivoting movement of the lower 191 and upper 192 jaw members which are pivotally linked together as generally indicated at 196. This movement will be described hereinbelow.

Figure 7:
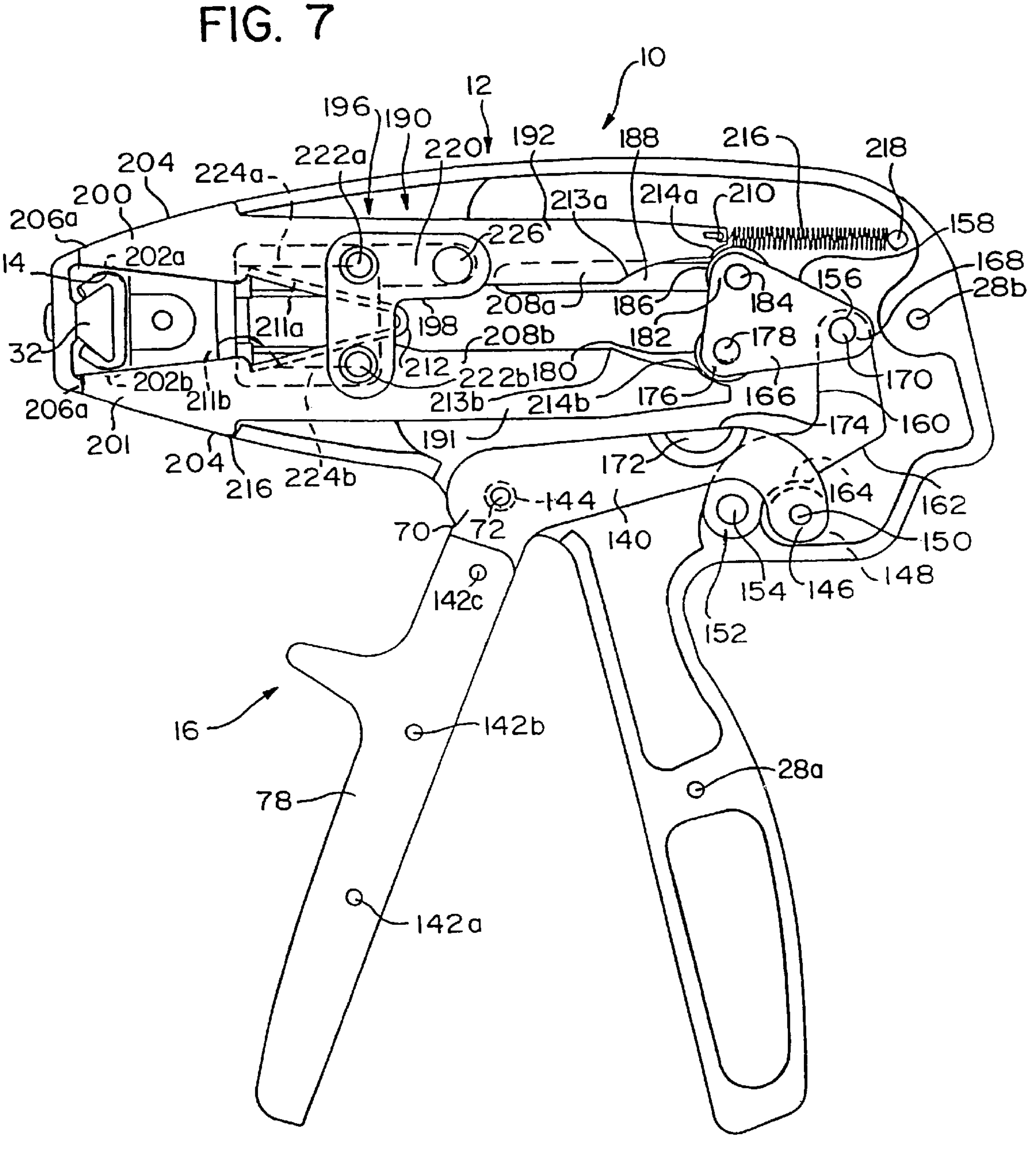
FIG. 7 is a left side elevation as in FIG. 5 showing the device in a resting position.

The jaw members 191 and 192 each define a head portion 201 and 200. respectively, and elongated jaw body portions **208*b* and 208*a*. Each head portion 200 and 201 includes a flat inner surface or face 228*a* and 228*b*, respectively, and an outer face portion 204, as best shown in FIG. 6. Each flat inner face 228*a* and 228*b* defines an arcuate groove 202*a* and 202*b*, respectively, which engage exterior surfaces of a C-shaped ring by receiving the shoulders of the C-shaped ring. The outer faces 204 of the slidable jaw members 191 and 192 are angled to conform to the contours of the housing assembly 12 when the jaw members are in a fully rearwardly retracted, or resting, position shown in FIG. 5. The side walls of the head portions of the housing members 18*a* and 18*b* define slots 206*a* and 206*b*, which slots cooperate to form an opening which opening allows the contoured jaws 191 and 192 to slide in and out of the housing assembly 12. Each elongated body portion 208*a* and 208*b* extends rearwardly into the interior of the housing assembly. The elongated body portion of the upper jaw member 192 holds a laterally extending spring bar 210 at the rearward portion thereof. Each elongated body portion 208*b* and 208*a* of each jaw member 191 and 192, respectively, defines a groove along an inner face thereof which grooves cooperate to receive the forwardly extending legs 211*a* and 211*b* of a wishbone spring 212 as shown in FIG. 7. Each jaw member 191 and 192 is pivotally attached to the link member 198 as described below and the wishbone spring 212 cooperates therewith to pivot the head portions 200 and 201** away from each other to effect an open position thereof.

The inner edges **213*a* and 213*b* of the elongated body portions 208*a* and 208*b* form arcuate curvilinear seats 214*a* and 214*b* which rollingly engage the biasing roller members 186 and 180, respectively, in the resting position shown in FIG. 7. The inner edges 213*a* and 213*b* may also be referred to as engageable inner surfaces which rollingly engage the roller members 186, 180. The formed rearward ends of return springs 216 are secured to an anchor pin 218 which is held within matching aligned bores on the interior of the housing assembly 12. The formed forward end of each return spring 216 engage opposite ends of the laterally extending spring bar 210 of the upper jaw member 192. The return springs 216 rearwardly bias the jaw members 191 and 192 and maintain contact between the actuating mechanism 16 and the ring applying and clinching mechanism 190** at all times.

Figure 12:
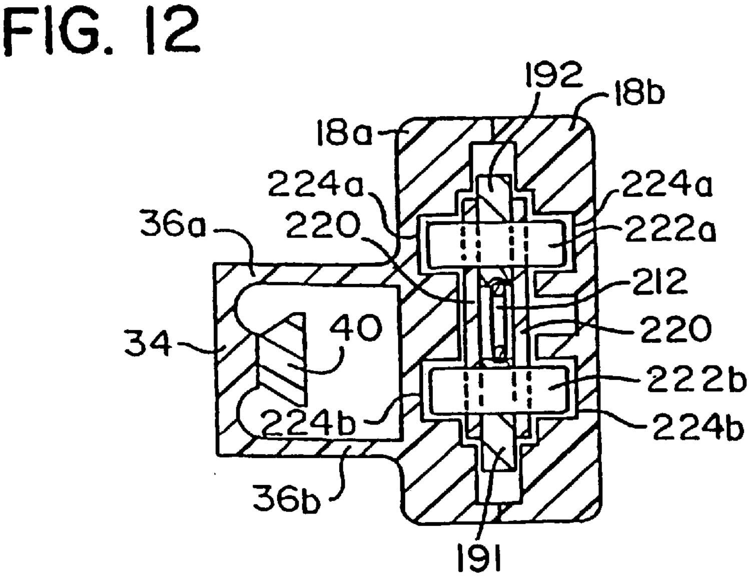
FIG. 12 is a cross-sectional view taken across line 12—12 of FIG. 5 showing jaw link member guide pins relationally positioned in respect to a plurality of interior housing slots.

As can best be seen in FIG. 5 and in the cross-sectional view in FIG. 12, the jaw link member 198 includes two essentially parallel L-shaped face portions 220 which are pivotally interconnected to both the upper jaw member 192 and the lower jaw member 191 by transversely extending guide pins **222*a* and 222*b*, respectively, the ends of which extend through the face portions 220 and are slidably received in a pair of upper 224*a* and a pair of lower 224*b* longitudinal housing slots. The two members of the pair of upper housing slots 224*a* are aligned and integrally formed on opposite sides of the housing assembly 12 and the two members of the pair of lower housing slots 224*b* are also aligned and integrally formed on opposite sides of the housing assembly 12. The guide pins 222*a* and 222*b* hold the front portions of the two face portions 220 of the link member 198 in spaced relation and guide pin 222***a* pivotally supports the upper jaw member 192 between an upper portion of the two face portions 220 and guide pin 222*b* pivotally supports the lower jaw member 191 between a lower portion of the two face portions 220. A portion of the link member 198 extends rearwardly adjacent to the upper jaw member 192 and the two rearwardly extending face portions thereof are apertured to receive a lateral pin 226 which lateral pin extends outwardly from each face portion on each side of the link member 198. The two ends of the lateral pin 226 are each slidably received into the pair of aligned upper housing guide pin slots 224*a* and by sliding therein, the lateral pin 226 cooperates with the guide pins 222*a* and 222*b* to maintain the slidable guide pins 222*a* and 222*b* in vertical alignment as they move longitudinally along the slots 224*a* and 224*b* as seen in FIGS. 7–10. The lateral pin 226 extends between the upper jaw member 192 and the lower jaw member 191 adjacent to a downwardly facing surface on the upper jaw member. The lateral pin 226 therefore does not interfere with the pivoting movement of either jaw member 191 or 192 about its respective guide pin member 222*a* or 222*b* when the jaw members 191 and 192 are pivoted towards each other while grasping or crimping a C-shaped ring. Therefore, the cooperation of the guide pins 222*a* and 222*b* and the lateral pin 226 with the upper and lower pairs of housing slots 224*a* and 224*b* provides for reciprocal horizontal movement of the jaw members and the cooperation of the guide pins 222*a* and 222*b* provides for the rotational or pivoting movement of the jaw members 191 and 192 by acting as pivotal points or rotational points for the jaw members.

With reference to FIG. 6, a cross-sectional view of the jaw head portions 200 and 201 shows the flat inner face 228*a* and 228*b* on each jaw member 191 and 192 and also shows the offset arcuate grooves 202*a* and 202*b* formed therein. The configuration of these arcuate grooves 202*a* and 202*b* matches the curvature of the shoulders 136*a* and 136*b* of the C-shaped ring to allow the jaw members 191 and 192 to grasp the C-shaped ring that is positioned in the feeding area 32 of the ring applying and clinching device 10. Also shown in FIG. 6 is a horizontal cut-out portion or channel 230*a* and 230*b* integrally formed on the outer side faces of each jaw member 191 and 192 which channels run the full length of the head portions 200 and 201 of the jaw member. After the jaw members 191 and 192 grip the leading C-shaped ring in the feeding area and begin to move it forwardly out of the feeding position 32, the channels 230*a* an d 230*b* allow the jaw members 191 and 192 to slide past the shoulders of the next C-shaped ring and simultaneously prevent the next ring from entering the feeding position until the jaw members 191 and 192 have full retracted back into the housing assembly and pivoted into an open position. The channels 230*a* and 230*b* are thus high enough to allow full crimping movement to take place without interference from the next C-shaped ring in the package of fasteners. After the jaw members 191 and 192 are retracted to their rest position and are fully open, the channels are pivoted outwardly in opposite directions away from the feeding area so that the top of the shoulders of the next C-shaped ring can be pushed between the jaw members 191 and 192 until the leading fastener is biased against the housing member 18*b* and into the feeding position 32 by the pusher 60.

Operation

The operation of the ring applying and clinching device 10 is illustrated in FIGS. 7–10. The resting, or standby position is shown in FIG. 7. When the device 10 is in the standby position as illustrated in FIG. 7, the ring applying and clinching mechanism 190 is biased to its extreme rearward position by the return springs 216 and the head portions 200 and 201 of the jaw members 192 and 191, respectively, are pivoted outwardly about the guide pins 222*a* and 222*b*, respectively, by the wishbone spring 212 to a fully open position. The upper portion of the actuating mechanism 16 is pivoted fully rearwardly about pin 72 and the movable handle 70 pivoted fully forwardly. The biasing member 158 is biased to its rearwardmost position by the jaw members 191 and 192 and the actuating cam member 152, which is pivotally connected to the biasing member 158 is biased to its rearwardmost position as well. Thus, it can be appreciated that in the resting or standby position, the two return springs 216 move the upper and lower jaw members 192 and 191, the biasing member 158 and the actuating cam member 152 in their rearmost positions and move the moveable handle member 70 to its fully forward or cocked position. The leading C-shaped ring in the package of C-shaped rings 14 on the fixed ring guide 40 is biased forwardly by the cooperation of pusher 60 and the flat spring 114 and so that it is biased against an inner surface of the housing member 18*b* and is thus in the feeding position 32 ready to be grasped by the jaw members 191 and 192.

Figure 8:
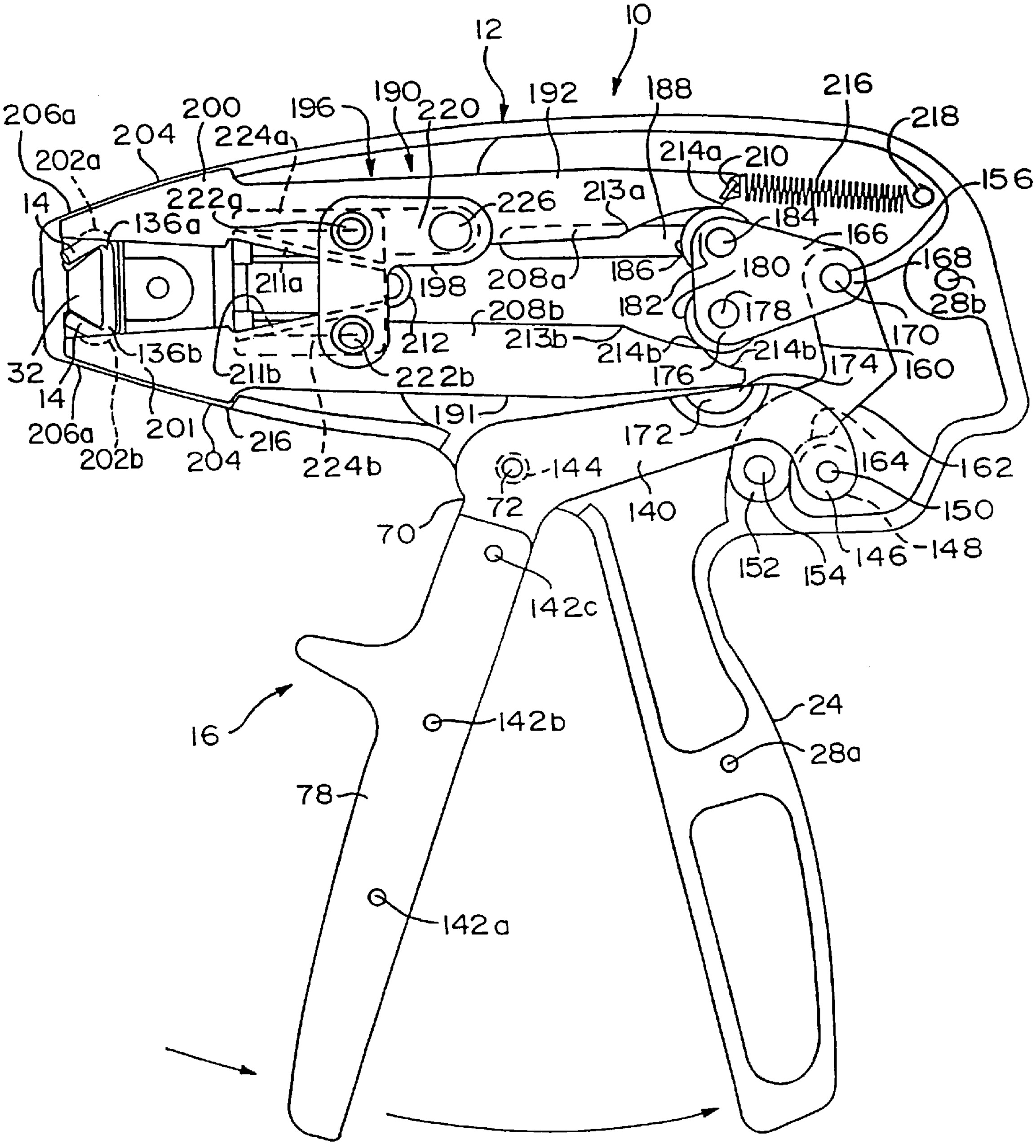
FIG. 8 is a left side elevation as in FIG. 7 showing a first intermediate position.
Figure 9:
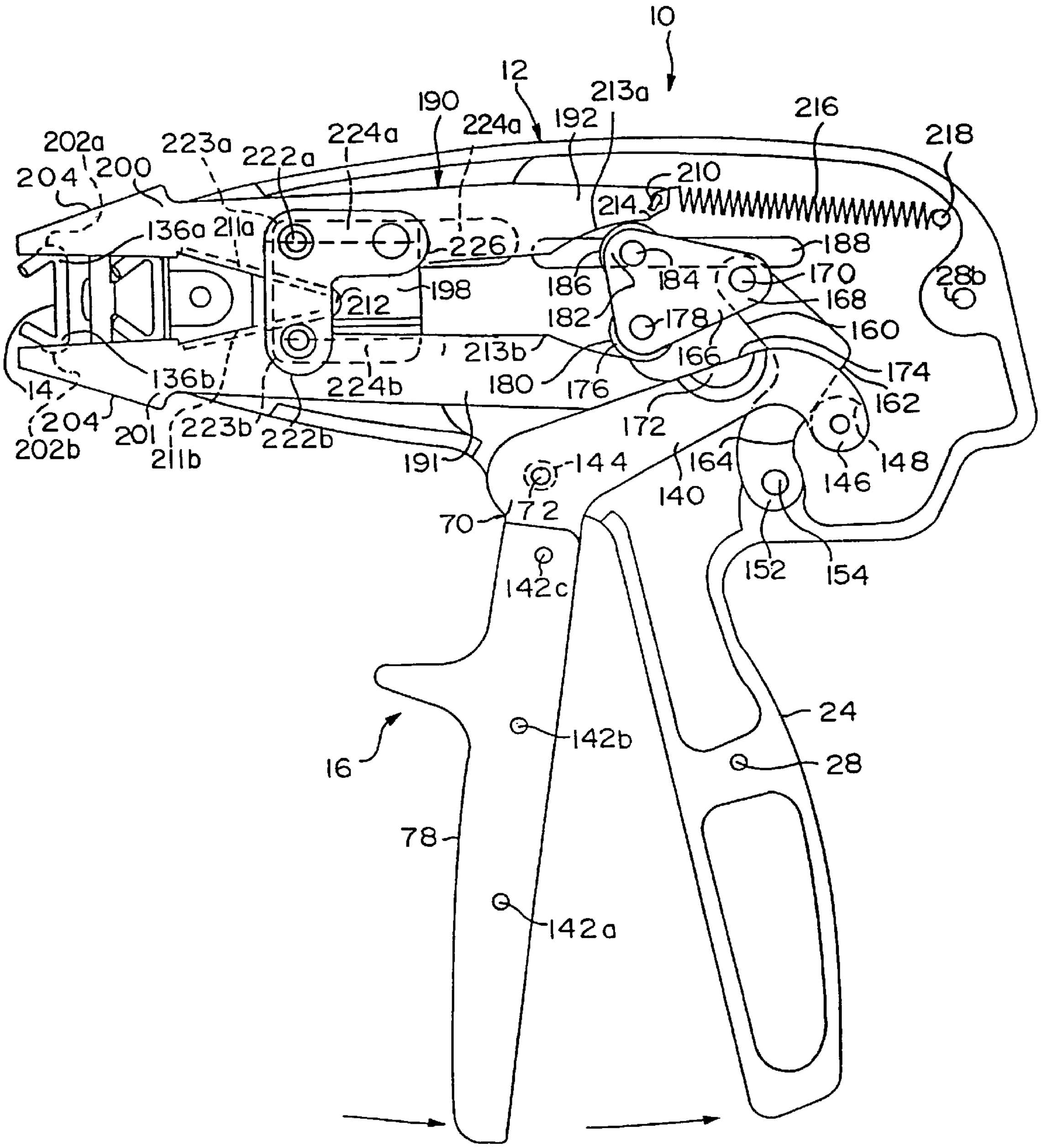
FIG. 9 is a left side elevation as in FIG. 7 showing a second intermediate position.
Figure 10:
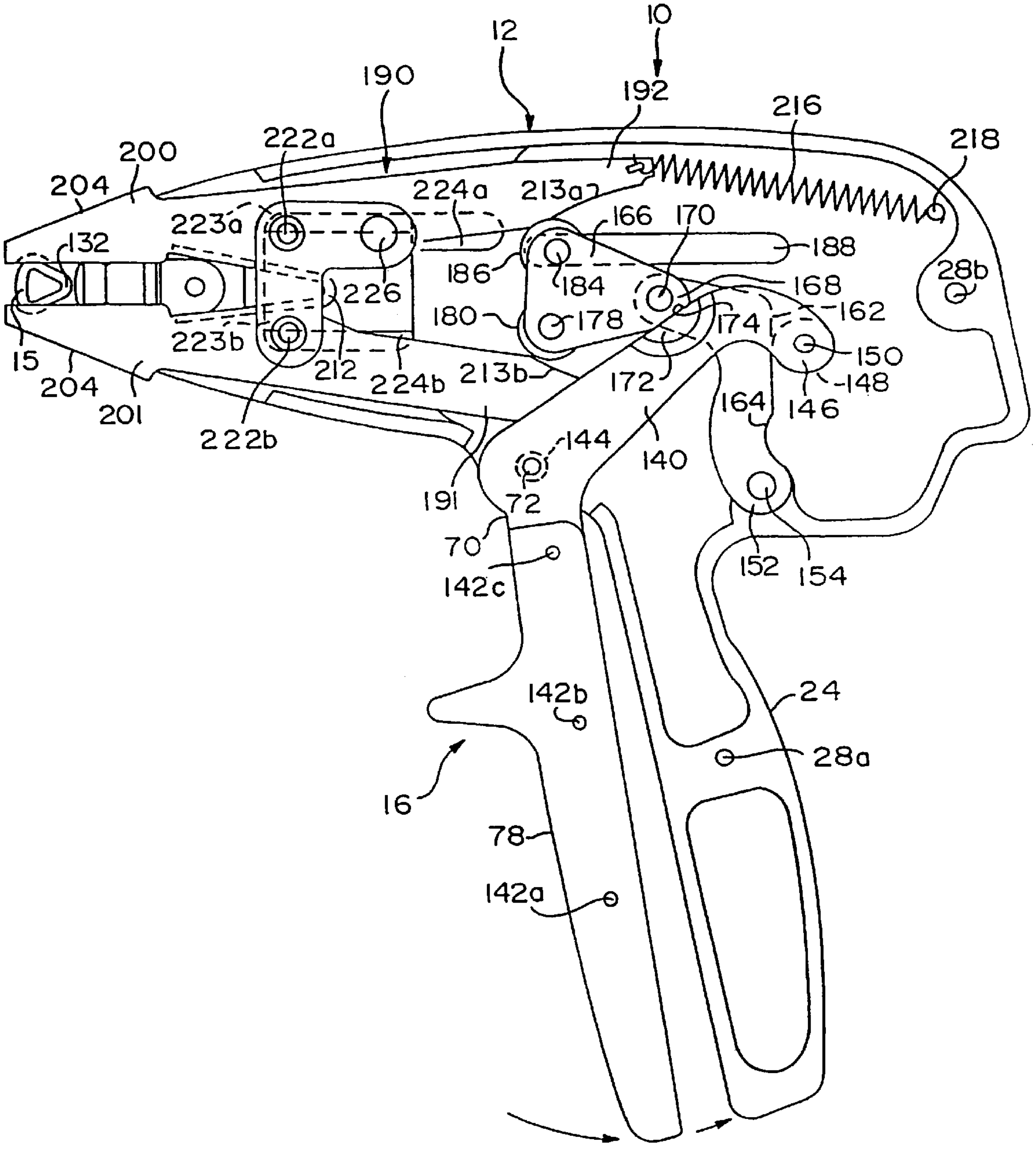
FIG. 10 is a left side elevation as in FIG. 7 showing a fully clinched position.

The rotation of the movable handle member 70 and the effects thereof are illustrated in FIGS. 8 through 10. These figures illustrate a crimping operation effected by actuation of the movable handle 70. As the movable handle 70 pivots from the standby or cocked position illustrated in FIG. 7 through the fully depressed position in FIG. 10, it rotates approximately thirty degrees. As the movable handle 70 pivots through these 30 degrees in one continuous motion, the device assumes three intermediate positions which are illustrated in FIGS. 8–10 and which will be described hereinbelow. In FIG. 8, the movable handle 70 has been pivoted toward the fixed handle 24 to the first intermediate position. This first intermediate position is effected after the handle 70 has moved rearwardly approximately 3 (three) degrees and this movement of the handle 70 effects the gripping action of the applying and clinching mechanism 190. More specifically, the pivotal movement of the handle 70 has acted through the handle roller 148 to drive the actuating cam member 152 slightly forward. The biasing member 158 therefore moves forwardly against the tension of the return spring 216 and the rollers 180 and 186 move forwardly out of their respective curvilinear seats 214*b* and 214*a*, which seats are integrally formed on a rear portion of the jaw members 191 and 192, respectively. The rollers 180 and 186 move forwardly and engage the arcuate inner surfaces 213*a* and 213*b* of the jaws members 192 and 191, respectively, and thereby rotate the jaw heads portions 200 and 201 inwardly about guide pins 222*a* and 222*b* against the spring force of the wishbone spring 212 into a gripping position where the arcuate grooves 202*a* and 202*b* on the inner face of each head portion capture and grip the shoulders 136*a* and 136*b* of the leading C-shaped ring 14 in the feeding position 32 without closing the opening defined between the leg portions of the ring. It can be appreciated that, through this first series of steps to effect movement, the applying and clinching mechanism 190 operates in direct response to the manual actuation of the movable handle 70.

Referring now to FIG. 9, continued pivoting of the movable handle 70 approximately an additional 7 or 8 degrees rotates the ring applying and clinching mechanism 190 into a second intermediate position. Operationally, this is used to effect the movement of the jaw members 191 and 192 longitudinally outwardly to an applying position. It can be appreciated that in this position the head portions 200 and 201 of the jaw members are holding the C-shaped ring 14 in a forward, unobstructed manner that allows the ring to be readily applied without interference from any fixed structure of the ring applying and clinching device 10. In this applying position, a portion of the workpiece to which the ring is to be applied is received within the lead ring interior through the lead ring opening. It can be understood that as the movable handle 70 is being manually depressed to effect the movement of the applying and clinching mechanism 190, the handle 70 pivots about pivot pin 72 and cams the actuating cam member 152 forwardly causing the biasing member 158 to advance along a horizontal path defined by the action of the guide pin 184 sliding along the pair of housing slots indicated at 188 defined by the two housing members 18*a* and 18*b*. The jaws members 192 and 191 resistively move forward against the spring force of the return springs 216 in response to the action of the biasing member 158 against the arcuate faces 213*a* and 213*b* of the respective jaw members 192 and 191. The biasing member 158 now produces a dual effect on the jaws as it moves forward. The increased force exerted by the biasing member 158 against the jaw member arcuate faces 213*a* and 213*b* continues to bias the jaw head portions 200 and 201 inwardly to effectively hold the ring 14 tightly during movement without pivoting the head portions inwardly to crimp the C-shaped ring, and the forward motion of the biasing member 158 overcomes return spring 216 tension, thereby positively driving the jaw members 191 and 192 linearly forwardly along a direct parallel path maintained by the cooperation of the guide pins 222*a* and 222*b* and the lateral pin 226 acting within the respective housing slots 224*a* and 224*b* until the link pins contact the forward end, 223*a* and 223*b* respectively, of each of the housing slots where the jaw members 191 and 192 are positively stopped in the forwardmost longitudinal or linear position. It can thus be appreciated that the ring helps keep the jaw members from pivoting together as they move linearly outwardly to the ends of the slots 224*a* and 224*b*.

Figure 11A:
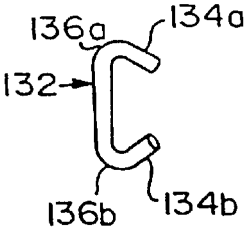
FIG. 11A is a side elevation of a single unbent ring.
Figure 11B:
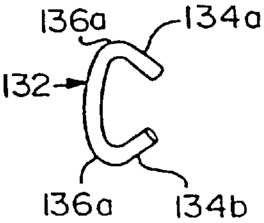
FIG. 11B is a side elevation of a single ring showing a crown portion partially bent.
Figure 11C:
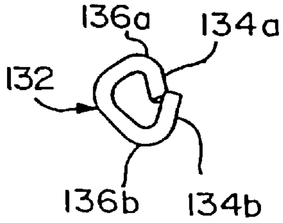
FIG. 11C is a side elevation of a single ring showing a crown portion partially bent and a plurality of legs in initial contact.
Figure 11D:
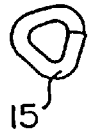
FIG. 11D is a side elevation of a single ring in a delta configuration.
Figure 11E:
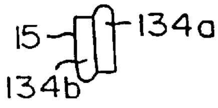
FIG. 11E is an end elevation of a single ring in a delta configuration showing the plurality of legs overlapping and in contact.

As can be seen in FIG. 10, the movable handle 70 has been rotated rearwardly to effect a third intermediate position which represents its fully clinched position which is realized by approximately a 19 or 20 degree rearward rotation beyond the position shown in FIG. 9. This clinching movement pivotally moves the head portions 200 and 201 of the jaw members 192 and 191, respectively, inwardly toward one another thereby squeezing the C-shaped ring 14 and forming it into a closed or a delta configuration 15. More specifically, when the jaws 191 and 192 are positively stopped in their linearly forwardmost position, further rearward pivoting movement of the handle 70 about pin 72 advances the biasing member rollers 180 and 186 forwardly over the arcuate faces 213*a* and 213*b* of the jaw members causing the jaws members 191 and 192 to pivot about link pins 222*a* and 222*b* toward each other against the tension of the wishbone spring 212. The head portions 200 and 201 of the jaw member 192 and 191, respectively, pivot toward one another crimping the ring until the handle 70 is fully depressed. As the jaws pivot toward one another, the crown 132 of the C-shaped ring is bent and forms a delta-shaped. The effect of a complete ring clinching sequence on an isolated C-shaped ring is shown in FIGS. 11A, 11B, 11C and 11D. FIG. 11E is an end view of the ring shown in FIG. 11D. because the legs 134*a* and 134*b* are offset from one another, and as the crown 132 is bent during the clinching movement, the legs 134*a* and 134*b* move toward one another so that they overlap and slide past each other so as to close the opening defined therebetween to form a delta-shape shown in FIGS. 11D and 11E. It can be seen that the delta configuration effects an essentially closed loop structure, thereby applying the ring in surrounding relation to the workpiece received in the interior thereof.

When the movable handle 70 is released, tension from the return springs 216 pulls the jaw members 191 and 192 rearwardly into the housing assembly. Concurrently, the wishbone spring 212 moves the jaw head portions 200 and 201 apart to a fully open position and pivots the jaw bodies 208*a* and 208*b* toward one another. As the arcuate faces 213*a* and 213*b* on the jaw bodies come together, because the biasing member 158 rollingly engages the jaw bodies through the roller elements 180 and 186, the biasing member 158 and the pivotally attached actuating cam member 152 move rearwardly with respect to both the housing assembly 12 and the jaw members 191 and 192 by pivoting about the pin members 170 and 154. This action of the camming member 152 rotates the movable handle 70 forward from its clinched, fully depressed position to its cocked or resting position, which is the position shown in FIG. 7.

What is claimed is:

1. A ring clinching and applying device for applying successive C-shaped rings to a workpiece, said device comprising:

a housing structure;

a magazine assembly constructed and arranged to support a ring supply comprising a plurality of releasably interconnected C-shaped rings with a lead ring of said supply disposed in a ready position and remaining releasably interconnected to said supply, each of the rings in said supply having opposing leg portions defining an opening therebetween for providing access to an interior of each ring, a pair of opposing jaw members having ring engaging surfaces facing generally towards one another, said ring engaging surfaces being configured to engage the lead ring of said supply in said ready position;

a manually operable ring clinching and applying mechanism operatively associated with said jaws, said ring clinching and applying mechanism comprising manually operable structure and jaw moving structure;

said manually operable structure and said jaw moving structure each being constructed and arranged to enable a ring applying operation to be performed by manually operating said manually operable structure such that said jaw moving structure responsively moves said jaws (1) first in a clinching direction such that said ring engaging surfaces thereof move generally towards one another and engage opposing exterior surfaces of the lead ring in the ready position thereof so as to positively grasp the lead ring without substantially closing the ring opening defined between the opposing leg portions thereof, (2) then in a forward ring applying direction towards the workpiece while said jaws continue to positively grasp the lead ring between the ring engaging surfaces thereof without substantial further movement of the jaws in the clinching direction such that said jaws separate the lead ring from the ring supply and move the lead ring forwardly from the ready position thereof into an applying position wherein a portion of the workpiece to which the lead ring is being applied is received within the interior of the lead ring through the ring opening between said leg portions and said jaw members continue to positively grasp the lead ring without substantially closing the ring opening thereof so as to support the lead ring in the applying position thereof, and (3) then further in said clinching direction while said lead ring is in said applying position thereof such that said ring engaging surfaces of said jaws further move generally towards one another so as to move the opposing leg portions of the lead ring into an adjacent overlapping relationship to close the lead ring opening and thereby apply the lead ring in surrounding relation to the workpiece portion received in the interior thereof;

said magazine assembly comprising feeding structure constructed and arranged to successively move the ring supply in a ring feeding direction to feed a successive lead ring of said ring supply towards and into said ready position to replace the aforesaid lead ring.

2. A ring clinching and applying device according to claim 1, wherein each of said jaws is pivotally mounted to said housing structure and has a rearwardly extending jaw body portion providing an inwardly facing camming surface;

said jaw moving structure comprising a camming member positioned and configured to engage said inwardly facing camming surfaces of said jaw members said manually operable structure and said camming member being constructed and arranged to enable said ring clinching and applying operation to be performed by manually operating said manually operable structure to responsively move said camming member such that (1) said camming member first cams said camming surfaces to move said rearwardly extending jaw body portions away from one another to pivotally move said jaws in said clinching direction such that said ring engaging surfaces thereof move generally toward one another and engage the exterior surfaces of the lead ring in the ready position thereof so as to positively grasp the ring without substantially closing the ring opening thereof, (2) then said camming member moves said jaws in said forward ring applying direction towards the workpiece while said jaws continue to positively grasp the lead ring between the ring engaging surfaces thereof without substantially further camming the camming surfaces of said jaw body portions to move the jaws further in the clinching direction such that said jaw members separate the lead ring from the ring supply and move the lead ring into said applying position without substantially closing the ring opening thereof, and (3) said camming member thereafter further cams the camming surfaces of said rearwardly extending jaw body portions away from one another while the lead ring is in the applying position thereof to move said jaw members further in said clinching direction such that said ring engaging surfaces of said jaw members further move generally towards one another so as to move the opposing leg portions of the lead ring into an adjacent overlapping relationship to close the lead ring opening and thereby apply the lead ring in surrounding relation to the workpiece portion received in the interior thereof.

3. A ring clinching and applying device according to claim 2, wherein said inwardly facing camming surfaces have an arcuate concave configuration.

4. A ring clinching and applying device according to claim 3, wherein said camming member comprises two rollers constructed and arranged to rollingly engage said camming surfaces during said ring applying operation to thereby move said jaws as aforesaid.

5. A ring clinching and applying device according to claim 4, wherein said ring engaging surfaces of said jaws each have an arcuate groove configured to receive a shoulder of the lead ring when said jaws grasp the lead ring.

6. A ring clinching and applying device according to claim 5, wherein said jaw members are pivotally mounted on guide pins, said housing structure providing two pairs of parallel slots on interior surfaces thereof, said guide pins being mounted within said slots, said guide pins and slots being positioned and configured such that said pins move forwardly within said slots as camming member moves said jaw members in said forward ring applying direction until said pins engage forward ends of said slots, thereby stopping the forward movement of said jaw members such that continued movement of said camming member responsive to manual operation of said manually operable structure cams the camming surfaces of said jaw body portions to pivot said jaw members about said guide pins in said clinching direction so as to apply the lead ring.

7. A ring clinching and applying device according to claim 6, further comprising a spring disposed between said jaw members, said sprins being configured to bias said jaw members opposite said clinching direction so as to maintain said ring engaging surfaces out of engagement with the lead ring until manual operation of said manually operable structure is effected.

8. A ring clinching and applying device according to claim 7, wherein said spring is a wishbone spring.

9. A ring clinching and applying device according to claim 5, wherein said manually operable structure comprises a pair of manually engageable handle members operatively connected to said camming member, said handle members and said camming member being constructed and arranged to enable said ring clinching and applying mechanisms to be performed by manually moving said handle members relatively toward one another to responsively move said camming member such that (1) said camming member first cams said camming surfaces to move said rearwardly extending jaw body portions away from one another to pivotally move said jaws in said clinching direction such that said ring engaging surfaces thereof move generally toward one another and engage the exterior surfaces of the lead ring in the ready position thereof so as to positively grasp the lead ring without substantially closing the ring opening thereof, (2) then said camming member moves said jaws in said forward ring applying direction towards the workpiece while said jaws continue to positively grasp the lead ring between the ring engaging surfaces thereof without substantially further camming the camming surfaces of the jaw body portions to move the jaws further in the clinching direction such that said jaw members separate the lead ring from the ring supply and move the lead ring into said applying position without substantially closing the ring opening thereof, and (3) said camming member thereafter further cams the camming surfaces of said rearwardly extending jaw body portions away from one another while the lead ring is in the applying position to move said jaws further in said clinching direction such that said ring engaging surfaces of said jaws further move generally towards one another so as to move the opposing leg portions of the lead ring into the adjacent overlapping relationship to close the lead ring opening and thereby apply the lead ring in surrounding relation to the workpiece portion received in the interior thereof.

10. A ring clinching and applying device according to claim 9, wherein one of said handle members is fixedly attached to said housing structure and the other of said handle members is pivotally attached to said housing structure.

11. A ring clinching and applying device according to claim 10, wherein said pivotally mounted handle has a portion protruding interiorly into said housing structure, said ring clinching and applying mechanism further comprising an actuating cam member having one opposing end portion pivotally mounted within said housing structure and another opposing end portion pivotally mounted to said camming member, said actuating cam member and said pivoting handle member being constructed and arranged such that pivotal movement of said pivoting handle member causes said interiorly protruding portion thereof to cammingly engage said cam member so that said actuating cam member causes the two rollers of said camming member to rollingly engage said inwardly facing camming surfaces and move said jaw members as aforesaid.

12. A ring clinching and applying device according to claim 11, wherein said interiorly protruding portion of said pivoting handle member comprises a pair of spaced walls interconnected by a pin, said pin being positioned and configured to cammingly engage said actuating cam member when said pivoting handle member is manually pivoted.

13. A ring clinching and applying device according to claim 12, wherein said actuating cam member is generally L-shaped and received between the spaced walls of said interiorly protruding portion of said pivoting handle member.

14. A ring clinching and applying device according to claim 12, further comprising a spring extending between one of said jaw members and said housing structure, said spring being positioned and configured to resist movement of said jaw members in said forward direction and return the jaw members to an initial non-operating position after manually releasing said manually operable structure.

15. A ring clinching and applying device according to claim 14, wherein said spring is a linear spring.

16. A ring clinching and applying device according to claim 1, wherein said housing structure comprises a pair of housing structure halves fastened together.

17. A ring clinching and applying device according to claim 1, wherein said magazine assembly comprises:

a guide mounted exteriorly of said housing structure, the supply of releasably connected C-shaped rings being slidably mounted on said guide, a pusher constructed and arranged to push the ring supply along said guide such that successive lead rings are pushed through an opening formed in said housing structure and into the ready position thereof.

18. A ring clinching and applying device according to claim 17, wherein said guide has a generally trapezoidal configuration with a longer side thereof facing inwardly towards said housing structure, the ring supply being slidably mounted on said guide such that crowns of the rings are disposed adjacent said longer side and the openings defined between the opposing leg portions face exteriorly with respect to said housing structure.

19. A ring clinching and applying device according to claim 18, wherein said housing structure comprises a pair of raised parallel walls extending on each longitudinal side of said guide so as to define guide channels on opposing sides of said guide, said pusher being slidably received within said channels and engageable with an end ring of the ring supply so as to push the ring supply along said guide in said feeding direction.

20. A ring clinching and applying device according to claim 19, wherein said magazine assembly further comprises a spring configured to move said pusher and the ring supply in said feeding direction.

21. A ring clinching and applying device according to claim 20, wherein said spring is a retractable flat spring having a forward end mounted to a roller and a rear end attached to said pusher, thereby biasing said pusher in said feeding direction.

22. A ring clinching and applying device according to claim 21, wherein said pusher comprises a wing-shaped structure and a shoe portion connected together, said housing structure comprising a pair of forward parallel side elements extending outwardly on each longitudinal side of a forward end of said guide and a wall member connected to said side element exteriorly of said guide so as define a passageway between said side elements, said shoe portion being configured to be received in said passageway as said pusher is being moved in said feeding direction such that said pusher continues to move in said feeding direction until said wing-shaped structure engages rearward edges of said side elements.

23. A ring clinching and applying device according to claim 22, wherein said raised parallel walls defining said guide channel define a rearwardly facing opening therebetween and provide rearwardly facing edges, said pusher being constructed and arranged such that an operator can move said pusher rearwardly against the force of said spring and engage forwardly facing edges of said wing-shaped structure with said rearwardly facing edges so as to prevent said pusher from moving in said feeding direction, thereby allowing the operator to load the magazine assembly with the supply of C-shaped rings.

* * * * *